UNITED STATES PATENT OFFICE.

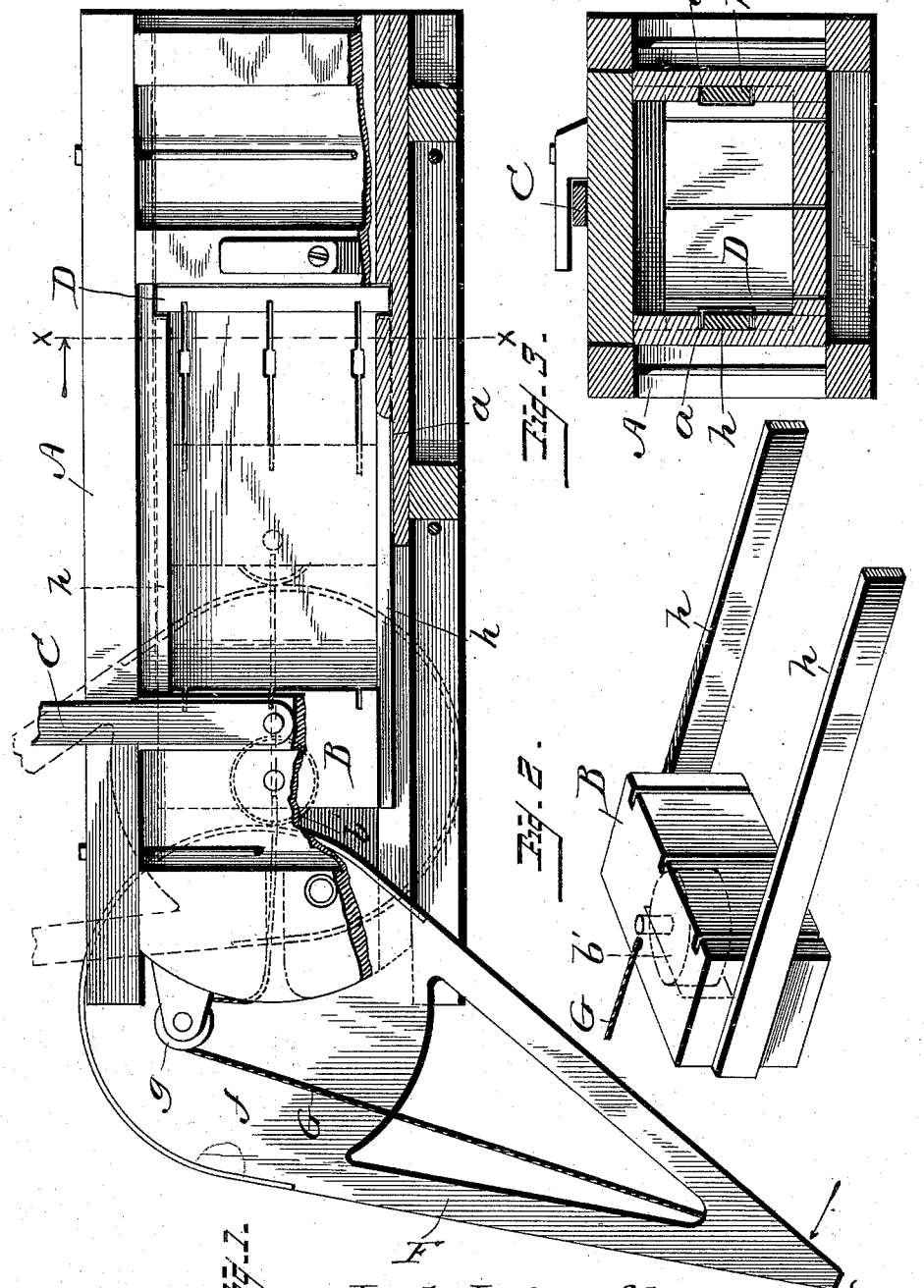

JOSEPH L. ORR, ADMINISTRATOR OF JAMES J. CORLEY, DECEASED, OF CHOCCOLOCCO, ALABAMA.

HAY-PRESS.

SPECIFICATION forming part of Letters Patent No. 488,400, dated December 20, 1892.

Application filed April 29, 1892. Serial No. 431,215. (No model.)

*To all whom it may concern:*

Be it known that JAMES J. CORLEY, deceased, late of Choccolocco, in the county of Calhoun and State of Alabama, did invent certain new and useful Improvements in Hay-Presses; and I, JOSEPH L. ORR, a citizen of the United States, administrator of said JAMES J. CORLEY, deceased, do hereby declare the following to be a full, clear, and exact description of the invention, such as will enable others skilled in the art to which it appertains to make and use the same.

This invention relates to presses designed for baling hay, straw, cotton, wool &c., in which the power is transmitted to the follower by a lever.

The improvement consists of the novel features and the peculiar construction and combination of the parts which will be hereinafter more fully described and claimed and which are shown in the annexed drawings, in which;

Figure 1 is a top plan view of a press embodying my invention, the cover and the bale box being removed, and showing the operation of the lever by dotted lines. Fig. 2 is a detail view of the follower detached showing the guides. Fig. 3 is a cross section about on the line X—X of Fig. 1.

The bale box A of ordinary construction, is provided in its sides with grooves or ways $a$ which receive the guides $h$ which are projected from the ends of the follower B. The side opposite the baling compartment is closed by a removable cover or door that is held in place by the bar C. The block D which supports the bale against the pressure of the follower B is constructed to slide in transverse grooves in the sides of the bale box and is notched in its ends to receive the guides $b$ of the follower which guides hold the said block in place. The lever F for actuating the follower is provided with a cam head $f$ which has pivotal connection with the bale box and is adapted to have its cam edge engage with and travel on the roller $b'$ on the follower B. This lever is adapted to be actuated by hand, horse or other suitable power. The roller $b'$ relieves friction and causes the pressure to be exerted about centrally on the follower. The cable G connected at one end to the follower and at the other end to the lever F near the outer end thereof and passing over the guide roller $g$ on the bale box, serves to return the follower to a normal position when returning the said lever to a starting position.

The operation of the invention can be readily understood from the foregoing description. However, it may be well to state that the bale can be removed laterally by removing the door heretofore referred to, or, the block D can be removed and the bale pressed out through the open end of the bale box by means of the lever and follower.

Having thus described my invention, what I claim, and desire to secure by Letters Patent is;

1. In a press the combination with the bale box, and a follower having a centrally disposed roller on its outer face, of a lever having a cam head, which latter is adapted to travel upon the said roller to move the follower in, a guide roller $g$ located to one side of the center of the bale box, and a cable connected at one end with the said follower, passing over the said guide roller and attached at its other end to the outer end of the said lever, substantially as described for the purpose specified.

2. In a press, the combination with a bale-box having guide grooves in its sides, and having transverse grooves, and a block adapted to slide in the transverse grooves and having notches in its ends, of a follower having guides projected from its ends and constructed to work in the said guide grooves and enter the notches in the ends of the said block, substantially as described.

In testimony whereof I affix my signature in presence of two witnesses.

JOSEPH L. ORR,
*Administrator of James J. Corley.*

Witnesses:
J. F. M. DAVIS,
J. D. ENGLISH.